US011505174B2

(12) United States Patent
Okubo et al.

(10) Patent No.: US 11,505,174 B2
(45) Date of Patent: Nov. 22, 2022

(54) VEHICLE CONTROL DEVICE

(71) Applicant: Hitachi Automotive Systems, Ltd., Hitachinaka (JP)

(72) Inventors: Satoru Okubo, Hitachinaka (JP); Nobuhiro Akasaka, Hitachinaka (JP); Satoshi Matsuda, Hitachinaka (JP); Yusuke Kogure, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 952 days.

(21) Appl. No.: 16/326,080

(22) PCT Filed: Jul. 26, 2017

(86) PCT No.: PCT/JP2017/026978
§ 371 (c)(1),
(2) Date: Feb. 15, 2019

(87) PCT Pub. No.: WO2018/037815
PCT Pub. Date: Mar. 1, 2018

(65) Prior Publication Data
US 2019/0176797 A1    Jun. 13, 2019

(30) Foreign Application Priority Data
Aug. 24, 2016 (JP) .............................. JP2016-163829

(51) Int. Cl.
*F16H 61/02* (2006.01)
*B60W 10/107* (2012.01)
(Continued)

(52) U.S. Cl.
CPC .......... *B60W 10/107* (2013.01); *B60W 10/04* (2013.01); *B60W 10/06* (2013.01);
(Continued)

(58) Field of Classification Search
CPC .... B60W 10/107; B60W 10/04; B60W 10/06; B60W 10/101; B60W 50/032;
(Continued)

(56) References Cited

U.S. PATENT DOCUMENTS

2002/0171383 A1* 11/2002 Hisada .................. F02D 41/062
                                                          318/432
2015/0353089 A1* 12/2015 Yoshino ................ B60W 10/04
                                                           701/54

FOREIGN PATENT DOCUMENTS

JP            5-87220 A       4/1993
JP            9-287656 A      11/1997
(Continued)

OTHER PUBLICATIONS

International Search Report (PCT/ISA/210) issued in PCT Application No. PCT/JP2017/026978 dated Nov. 14, 2017 with English translation (six pages).
(Continued)

*Primary Examiner* — Justin Holmes
(74) *Attorney, Agent, or Firm* — Crowell & Moring LLP

(57) ABSTRACT

The present invention realizes a vehicle control device that, even when power characteristics of a power generation device and a power transmission device changes, senses degradation of vehicle components, corrects a drive instruction to the power transmission device, and is thereby capable of stabilizing vehicle behavior over a long term. The present invention, in a predetermined vehicle environment state, measures fluctuation in drive power and acceleration in a transient region by using vehicle behavior sensors 4, performs comparison with a reference fluctuation, and thereby senses degradation of vehicle components. The drive instruction to the transmission 16-side is corrected in accordance with the degradation of vehicle components that is sensed. Thus, it is possible to stabilize vehicle behavior
(Continued)

(performance) over a long term even when, during automated driving, the power characteristics of the drive power source and the transmission 16 change due to factors such as time degradation of vehicle components.

10 Claims, 7 Drawing Sheets

(51) Int. Cl.
*B60W 50/032* (2012.01)
*B60W 50/04* (2006.01)
*B60W 10/06* (2006.01)
*F16H 59/66* (2006.01)
*F16H 59/70* (2006.01)
*B60W 10/101* (2012.01)
*B60W 10/04* (2006.01)
*F16H 59/68* (2006.01)

(52) U.S. Cl.
CPC ........ *B60W 10/101* (2013.01); *B60W 50/032* (2013.01); *B60W 50/04* (2013.01); *F16H 59/66* (2013.01); *F16H 59/70* (2013.01); *F16H 61/02* (2013.01); *F16H 2059/6823* (2013.01)

(58) Field of Classification Search
CPC ........ B60W 50/04; F16H 59/66; F16H 59/70; F16H 61/02; F16H 2059/6823
See application file for complete search history.

(56) References Cited

FOREIGN PATENT DOCUMENTS

| | | | |
|---|---|---|---|
| JP | 2000-45811 A | | 2/2000 |
| JP | 2000-313250 A | | 11/2000 |
| JP | 2003-329126 A | | 11/2003 |
| JP | 2005-337053 | | 12/2005 |
| JP | 2006-90536 A | | 4/2006 |
| JP | 2009-97542 | | 5/2009 |
| JP | 2010175058 A | * | 8/2010 |
| JP | 2012-46003 A | | 3/2012 |
| JP | 2012-179955 A | | 9/2012 |
| JP | 2014020262 A | * | 2/2014 |
| JP | 2016-78704 | | 5/2016 |

OTHER PUBLICATIONS

Japanese-language Written Opinion (PCT/ISA/237) issued in PCT Application No. PCT/JP2017/026978 dated Nov. 14, 2017 (six pages).

* cited by examiner

VEHICLE CONTROL DEVICE

TECHNICAL FIELD

The present invention relates to a vehicle control device for stabilizing vehicle behavior (performance).

BACKGROUND ART

In automated driving systems, control architectures are being proposed that cover the series of data flow from recognition-system control including spatial recognition using sensor information and map information and course generation, to vehicle-system control of generating, from the generated course, a command value for an actuator ECU such as an engine, a steering, and a brake.

Here, the actuator ECU controls actuators based on drive commands from an ECU that supervises vehicle motion (referred to here as a vehicle integration ECU). In the powertrain area, automated driving is realized by the vehicle integration ECU issuing a drive command to an engine control ECU, whereby a gear change control ECU performs gear change control based on torque information calculated by the engine ECU. That is, even though automated driving systems have been introduced, there are automated driving systems in which it is the engine, or more specifically the throttle, that is automatically controlled and the automatic transmission-side is not automated.

Here, publicly known techniques as those below are known as correction techniques for cases in which power characteristics have changed due to time degradation of the engine and automatic transmission.

For example, there is a technique in which, in a hybrid vehicle (HEV) having an engine and a motor as drive power sources, a drive torque level difference occurring upon switching between engine drive and motor drive is suppressed by compensating for the error between an actual value and a command value of output torque. The error derives from time degradation and machine difference of each of the engine and the motor.

In detail, in a state in which power transmission of a stepped automatic transmission is cut off, torque monitoring is performed at the motor-side by fastening a clutch between the engine and the motor and driving the engine according to a certain command value. Here, the technique (the technique disclosed in PTL 1) suppresses the torque level difference upon switching of drive from engine drive to motor drive by detecting the torque error between the engine and the motor.

Further, for example, there is a technique of suppressing a gear change shock occurring upon coast downshift. The coast downshift is accompanied by rotation synchronizing control executed by an input shaft torque imparted to a transmission from a drive power source. In detail, the technique (the technique disclosed in PTL 2) relatively suppresses a change rate of the input shaft torque when the rotation synchronizing control is executed, in accordance with the area of a difference rotation speed of a release-side clutch that participates in the coast downshift.

Further, for example, there is a technique (the technique disclosed in PTL 3) of reducing a gear change shock by controlling a throttle even when a temporal change in power characteristics occurs, by estimating the output characteristics of an engine by using an output shaft rotation sensor. Further, for example, there is a technique (the technique disclosed in PTL 4) of always maintaining excellent fuel efficiency even when a temporal change occurs, by creating gear change lines based on a fuel efficiency map, and further performing learning of the fuel efficiency map during travel and correcting the gear change lines based on the fuel efficiency map yielded by learning so that an engine rotation range achieving good fuel efficiency is always used.

Further, for example, among control devices for cars provided with stepped automatic transmissions, a control device that, in order to reduce a gear change shock, executes control of suppressing output shaft torque at a correct timing by accurately detecting a switching timing of a clutch from information such as a change rate of output shaft rotation speed and power characteristics.

CITATION LIST

Patent Literature

PTL 1: JP 2012-179955 A
PTL 2: JP 2012-046003 A
PTL 3: JP 2000-313250 A
PTL 4: JP H09-287656 A

SUMMARY OF INVENTION

Technical Problem

However, the technique disclosed in PTL 1 attempts to suppress the torque level difference upon transition from engine drive to motor drive by grasping a change in engine power characteristics by performing torque monitoring at the motor, the time degradation of which is relatively small. According to the technique disclosed in PTL 1, adjustment to the one with lower performance is performed upon the switching of drive, and this leads to a decrease in performance as a vehicle.

Further, in the technique disclosed in PTL 1, only the drive power source-side is taken into consideration, and thus there are cases in which synchronization between the drive power source and the transmission-side cannot be secured. In such cases, during normal manual driving, the driver would feel and sense the degradation in power characteristics and automatically perform feedback control of stepping deeper on the accelerator pedal, etc., but in the case of automated driving, there is a problem that engine racing and engine stalling may occur in the transient region due to a deviation of the timing of transition to the target gear stage (or the target ratio). This deviation in timing is brought about by time degradation of the transmission-side.

With regards to the technique disclosed in PTL 2, the technique is for suppressing the gear change shock occurring upon the coast downshift accompanied by rotation synchronizing control, and it is difficult to say that the technique covers driving scenes during automated driving. Further, while it is indicated that the change rate of the input shaft torque is changed in accordance with a temporal change of a working fluid (i.e., ATF), the temporal change is defined only in terms of oil temperature and viscosity change occurring after temporal change is not taken into consideration.

With regards to the technique disclosed in PTL 3, the technique detects a temporal change in torque characteristics of the drive power source, similarly to the technique disclosed in document 1, but in particular does not take into consideration clutch slipping and the temporal change of a hydraulic fluid at the stepped automatic transmission-side, and thus there are cases in which synchronization between the drive power source and the transmission-side cannot be secured. In such cases, during normal manual driving, the driver would feel and sense the degradation in power characteristics and automatically perform feedback control of stepping deeper on the accelerator pedal, etc., but in the case of automated driving, there is a problem that engine racing and engine stalling may occur in the transient region due to a deviation of the timing of transition to the target gear stage (or the target ratio). This deviation in timing is brought about by time degradation of the transmission-side.

Further, also with regards to the technique disclosed in PTL 4, the technique detects a temporal change in torque characteristics of the drive power source, similarly to the technique disclosed in document 1, but in particular does not take into consideration clutch slipping and the temporal change of a hydraulic fluid at the stepped automatic transmission-side, and thus there are cases in which synchronization between the drive power source and the transmission-side cannot be secured. In such cases, during normal manual driving, the driver would feel and sense the degradation in power characteristics and automatically perform feedback control of stepping deeper on the accelerator pedal, etc., but in the case of automated driving, there is a problem that engine racing and engine stalling may occur in the transient region due to a deviation of the timing of transition to the target gear stage (or the target ratio). This deviation in timing is brought about by time degradation of the transmission-side.

The present invention has been made in view of the above-described problems, and an aim thereof is to realize a vehicle control device that, even when power characteristics of a power generation device and a power transmission device change in automated driving due to factors such as time degradation, senses degradation of vehicle components, corrects a drive instruction to the power transmission device, and is thereby capable of stabilizing vehicle behavior (performance) over a long term.

Solution to Problem

In order to achieve the above-described aim, the present invention is configured as follows.

A vehicle control device, provided with: a target drive torque determination unit that determines a target drive torque for a drive torque generation mechanism driving a vehicle based on control details generated in advance, and controls operation of the drive torque generation mechanism; a performance change information acquisition unit that acquires information relating to a change in performance of vehicle components, the vehicle components including at least one of the drive torque generation mechanism and a transmission that determines a target gear ratio based on the target drive torque; and a target gear ratio correction unit that corrects the target gear ratio determined based on the target drive torque, in accordance with the information relating to the change in performance.

Advantageous Effects of Invention

The present invention is capable of realizing a vehicle control device that, even when power characteristics of a power generation device and a power transmission device change in automated driving due to factors such as time degradation, senses degradation of vehicle components, corrects a drive instruction to the power transmission device, and is thereby capable of stabilizing vehicle behavior (performance) over a long term.

DESCRIPTION OF EMBODIMENT

In the following, an embodiment of the present invention is described with reference to the drawings.

EXAMPLE

Figure 1:
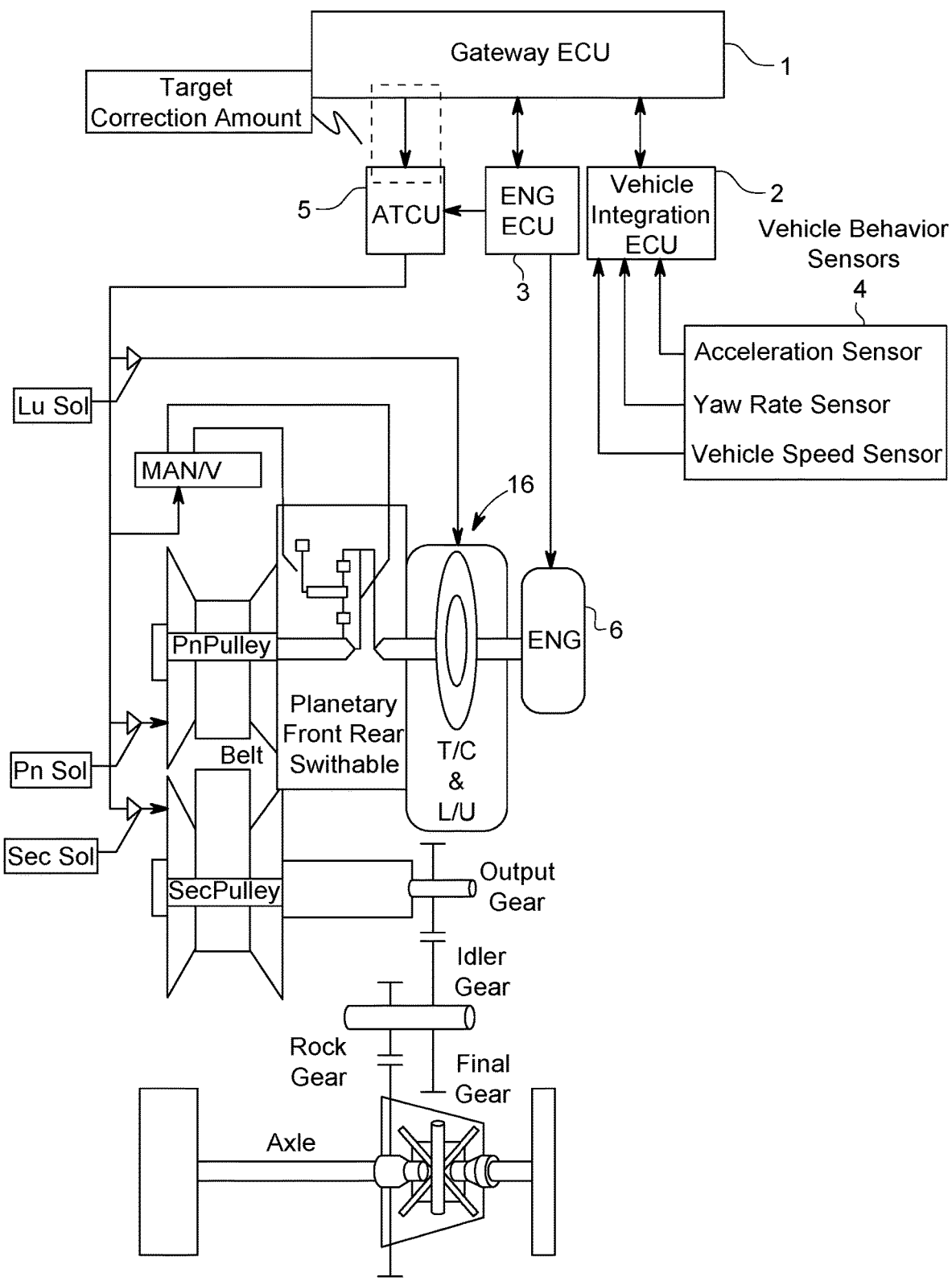
FIG. 1 is a system configuration diagram extracting a powertrain system during automated driving, according to one example of the present invention.
Figure 7:
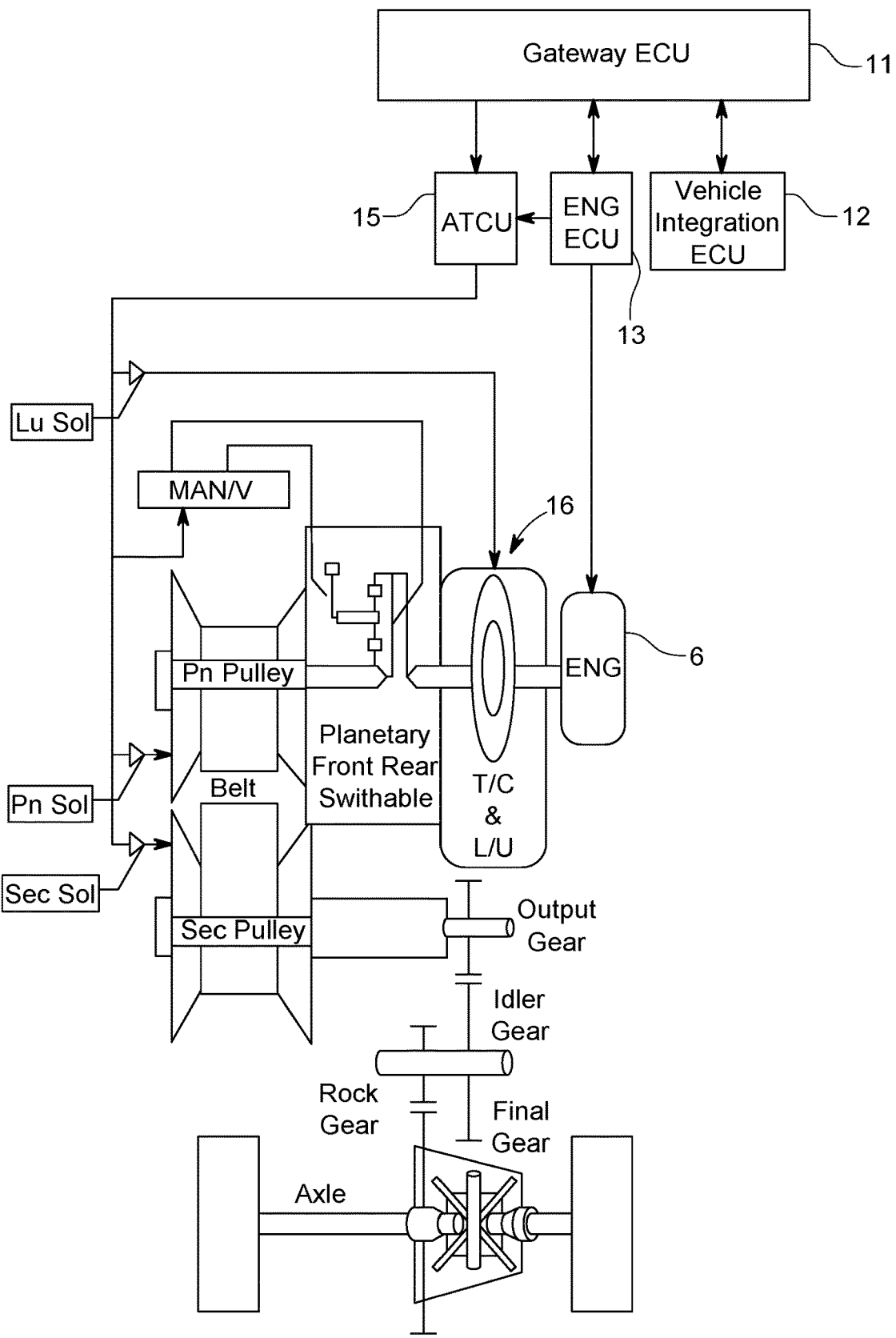
FIG. 7 is a diagram illustrating, for comparison with the present invention, one example, differing from the present invention, of a system configuration extracting a powertrain system during automated driving.

FIG. 1 is a system configuration diagram extracting a powertrain system during automated driving, according to one example of the present invention, and FIG. 7 is a diagram illustrating, for comparison with the present invention, one example, differing from the present invention, of a system configuration extracting a powertrain system during automated driving.

Before describing one example of the present invention, the comparative example illustrated in FIG. 7 is described.

In FIG. 7, a vehicle integration ECU 12 acquires environment information and around self-vehicle map information (road gradient and road curvature radius) from a radar, a camera, etc., and performs target course calculation. Subsequently, the vehicle integration ECU 12 calculates a target vehicle speed from the target course, and transmits the information to an engine ECU 13 via a gateway ECU 11.

The engine ECU 13 calculates a target acceleration from a current actual vehicle speed and the target vehicle speed, and specifies a target engine torque corresponding to the target acceleration. Here, the engine ECU 13 is trying to secure synchronization between an engine 6 and a transmission by controlling the engine 6 so that the target engine torque is achieved and, at the same time, transmitting, to a transmission ECU (ATCU) 15, an estimated engine torque and information of a target drive torque to be transmitted to the road surface.

However, with the configuration illustrated in FIG. 7, there are quite a few cases in which synchronization between the engine 6 and the transmission cannot be secured because only the engine 6-side is taken into consideration with regards to time degradation. In such cases, during normal manual driving, the driver would feel and sense the degradation in power characteristics and perform feedback control by stepping deeper on the accelerator pedal, etc., but in the case of automated driving, racing and stalling of the engine 6 may occur in the transient region because the actual gear ratio does not reach a target gear ratio due to time degradation of the transmission 1.

In contrast to this, in the system configuration of the present invention illustrated in FIG. 1, a vehicle integration ECU 2 not only connects to an engine ECU 3 via a gateway ECU 1 but also to an ATCU 5. Further, in order to sense vehicle behavior caused by time degradation of components, signals from vehicle behavior sensors 4 are also supplied to the vehicle integration ECU 2. The vehicle behavior sensors 4 are: an acceleration sensor 41; a yaw rate sensor 42; and a vehicle speed sensor 43.

According to the configuration of one example of the present invention illustrated in FIG. 1, during traveling by automated driving, time degradation of the powertrain system can be sensed by a performance change information acquisition ECU (a vehicle posture control unit) based on the information from the vehicle behavior sensors 4. Here, sensing of degradation of the powertrain system is enough, and there is no need to exactly specify abnormal parts. The reason for this is because the present invention is for correcting an actuator command value at the transmission 16-side, which is the final stage of the powertrain system and has the effect of stabilizing vehicle behavior by performing correction corresponding to the time degradation at the quickly-responding transmission 16.

Here, the engine ECU 3, which is a target drive torque determination unit, performs feedback control of the engine 6, which is a drive torque generation mechanism of the vehicle, based on the determined target drive torque, and as described later, the ATCU 5, which is a target gear ratio correction unit, performs feedforward control of the transmission 16 based on the target drive torque.

Figure 2:
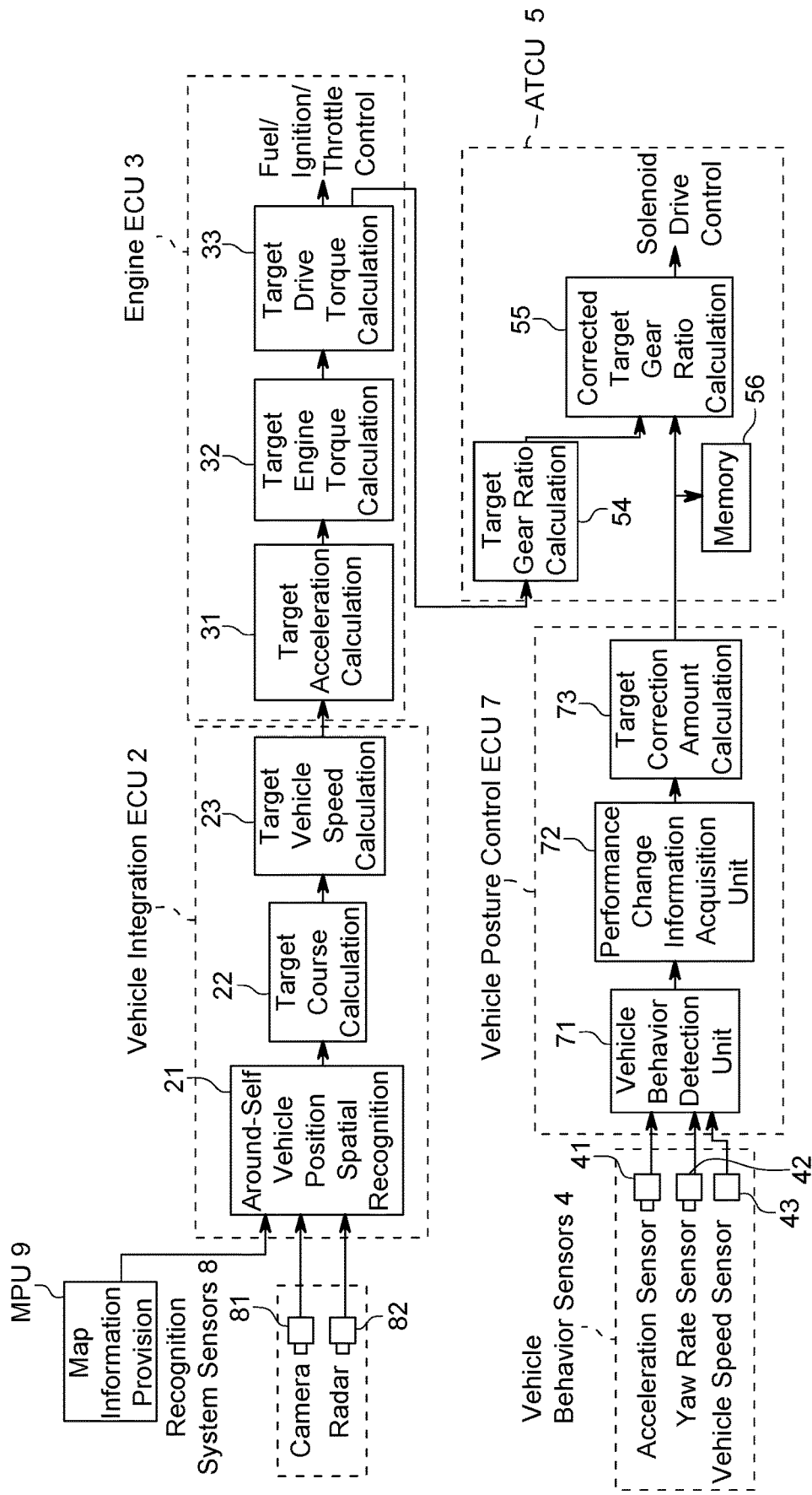
FIG. 2 is a diagram illustrating a control flow from sensor input to a drive torque output from an automatic transmission, in one example of the present invention.

FIG. 2 is a diagram illustrating a control flow from the vehicle behavior sensors to the drive torque output from the automatic transmission 16.

In FIG. 2, first, in the vehicle integration ECU 2, an around self-vehicle position space recognition unit 21 performs spatial recognition by using map information from a MPU 9 and information from recognition-system sensors 8 including a camera 81 and a radar 82, and a target course calculation unit 22 calculates a target course.

Next, a target vehicle speed calculation unit 23 calculates a target vehicle speed at which the target course can be traveled, and transmits the information to a target acceleration calculation unit 31 of the engine ECU 3. Actual vehicle speed information is also supplied to the target acceleration calculation unit 31, and the target acceleration calculation unit 31 calculates a target acceleration from the current actual vehicle speed and the target vehicle speed. Then, the calculated target acceleration is supplied to a target engine torque calculation unit 32, which determines a target engine torque corresponding to the target acceleration. Then, a target drive torque calculation unit 33 performs control of the fuel supply to the engine, ignition timing, and throttle so that the target engine torque is achieved, and at the same time, transmits, to a target gear ratio calculation unit 54 of the ATCU 5, an estimated engine torque and information of a target drive torque to be transmitted to the road surface.

Concurrently with the above-described processing, in a vehicle posture control ECU 7, a vehicle behavior detection unit 71 detects information (acceleration, yaw rate, and vehicle speed) from the vehicle behavior sensors 4, and based on the detected vehicle behavior information, a performance change information acquisition unit 72 senses time degradation of the powertrain system. The sensing of the time degradation of the powertrain system is described later. A target correction amount calculation unit 73 calculates a target correction amount for the transmission 16 based on a change rate of vehicle behavior, and transmits the information to a corrected target gear ratio calculation unit 55 of the ATCU 5.

The corrected target gear ratio calculation unit 55 of the ATCU 5 calculates a corrected target gear ratio from the target drive torque information from the engine ECU 3 and the target correction amount from the vehicle posture control ECU 7, and outputs a drive torque by controlling actuators inside the transmission 16 (i.e., by performing solenoid drive control). The above-described sensing of the time degradation of the powertrain system, performed by the performance change information acquisition unit 72, is carried out under a certain condition, and feedback to the corrected target gear ratio is performed. Note that the target correction amount calculated by the target correction amount calculation unit 73 is stored to a non-volatile memory 56.

Note that while the vehicle posture control ECU 7 is illustrated as an ECU separate from the vehicle integration ECU 2 in FIG. 2, the vehicle posture control ECU 7 can be included in the vehicle integration ECU 2.

Figure 3:
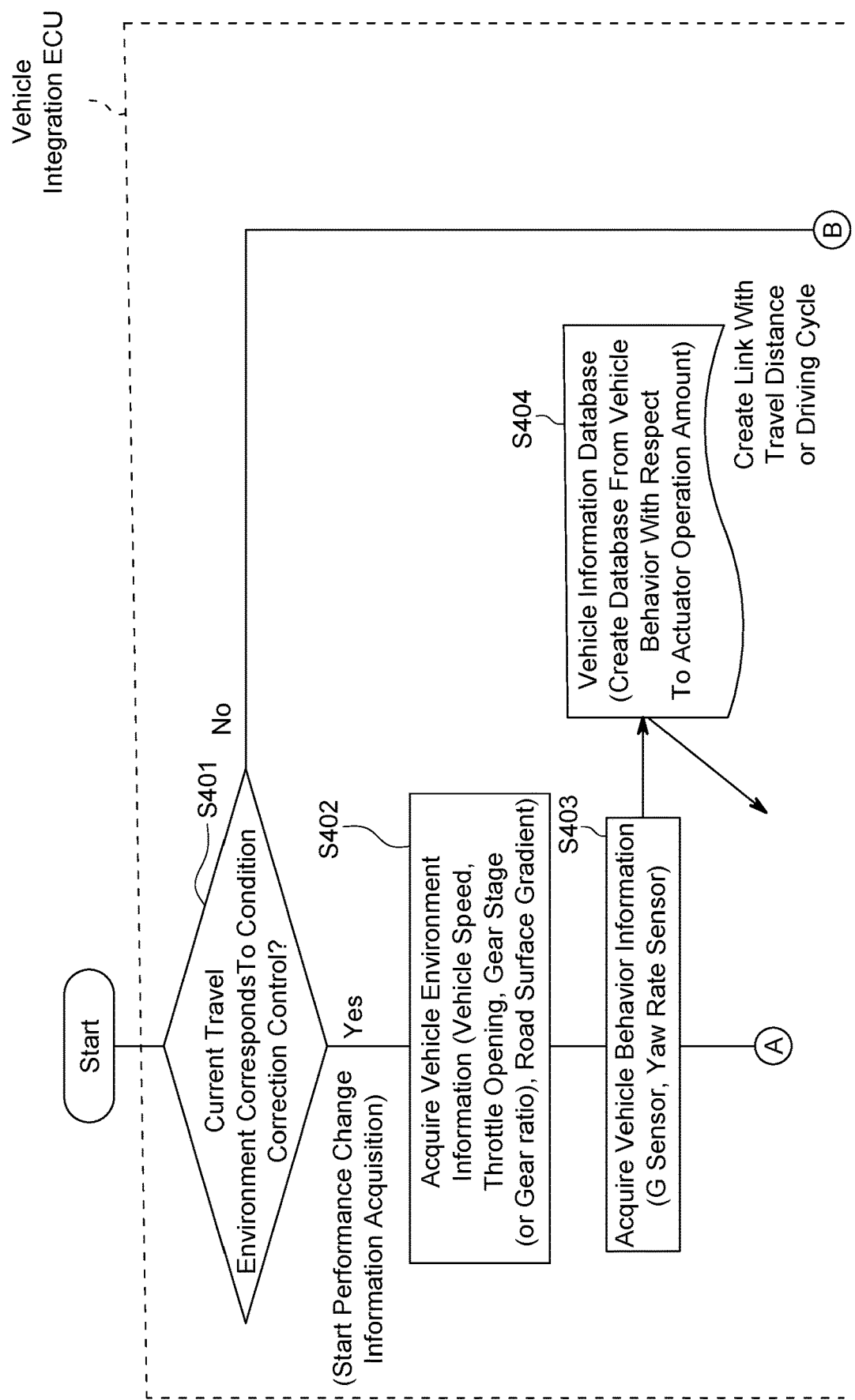
FIG. 3 illustrates a control flow of automated driving time degradation correction control, in one example of the present invention.
Figure 3:
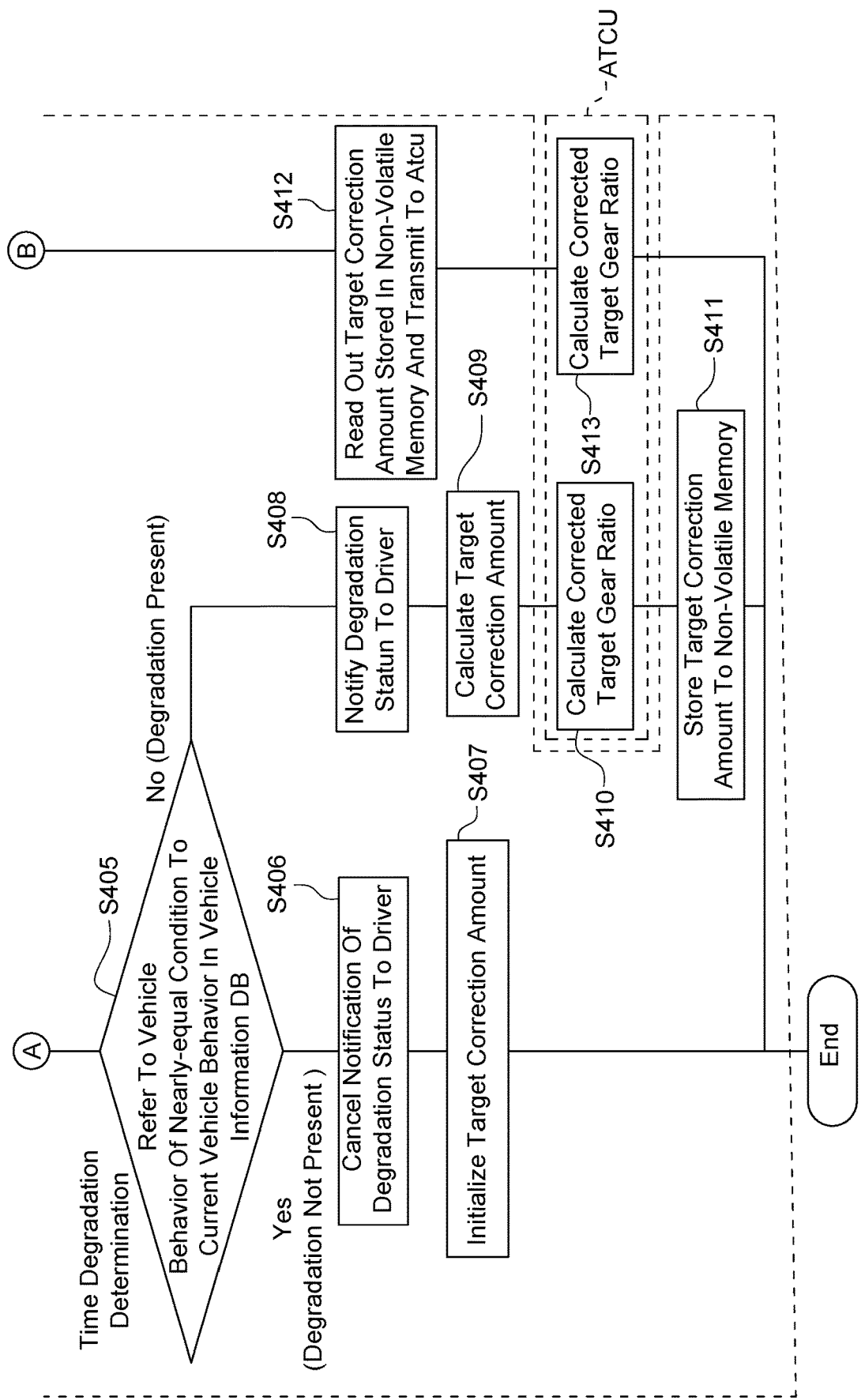

FIG. 3 illustrates a control flow of automated driving time degradation correction control in one example of the present invention.

Step S401 in FIG. 3 is a step in which, during vehicle travel by automated driving, the vehicle integration ECU 2 determines, based on the map information, whether the current travel environment corresponds to the condition for carrying out the time degradation correction control.

In the later-described time degradation determination, the current vehicle environment and a vehicle information database (referred to as vehicle information DB in the following) are compared to perform the degradation determination. Matching of vehicle environment needs to be performed for the comparison between the current vehicle environment and the vehicle information DB, and this means that the vehicle information DB needs to include a large amount of data of vehicle speeds, throttle openings, gear ratios, road surface gradients, vehicle behaviors, etc. Due to this, if the time degradation correction control is performed at all times, CPU processing load and memory consumption amount become high and there is a risk that gear change control, which needs to be performed primarily, may be delayed. That is, in order to suppress the CPU processing load and memory consumption amount, it is necessary to set in advance the timing at which the time degradation correction control is to be carried out. Due to this, road gradient and curvature radius are acquired from the map information, and the time degradation correction control is carried out only when the acquired road gradient and curvature radius satisfy a predetermined condition.

However, the time degradation correction control can be carried out at all times if the CPU processing load and memory consumption amount of the system to be applied to the present invention do not affect the gear change control, which needs to be performed primarily.

When it is determined in step S401 that the time degradation correction control can be carried out, processing proceeds to step S402.

Step S402 is a step for acquiring information of vehicle environment when it is determined that the time degradation correction control can be carried out. In detail, the step is for acquiring vehicle speed, throttle opening, gear ratio, road surface gradient, curvature radius (R), etc., and the purpose thereof is to, if there is a difference caused by the timing of the acquisition or the time degradation determination in any piece of information when comparison with the vehicle information DB is performed, cancel the time degradation determination or calculate a target correction amount based on difference information.

Next, processing proceeds to step S403. Step S403 is a step of acquiring information of vehicle behavior when it is determined that the time degradation correction control can be carried out. Similarly to step S402, the purpose thereof is to, if there is a difference caused by the timing of the acquisition or the time degradation determination in any piece of information when comparison with the vehicle information DB is performed, cancel the time degradation determination or calculate a target correction amount based on difference information.

Next, processing proceeds to step S404, in which a database is created from data such as vehicle speed, throttle opening, gear ratio, road surface gradient, vehicle behavior, etc., in a case in which the condition for carrying out the time degradation correction control is satisfied. The vehicle information DB is configured by creating a database from vehicle behavior with respect to actuator operation amounts up to the information acquisition timing, as well as vehicle information acquired at arbitrarily defined timings, and is configured so that a temporal change in power characteristics of component machines can be checked, so that it is possible to determine whether a change in power characteristics of the component machines derives from time degradation or machine failure.

Next, processing proceeds to step S405. Step S405 is a step for performing the time degradation determination, in a case in which the condition for carrying out the time degradation correction control is satisfied. The degradation determination is performed by comparing the current vehicle behavior and the vehicle information DB. When it is determined in this step that time degradation is not present, it can be judged that the power characteristics have been improved by replacement of components or the replacement of consumables, and thus, the notification of degradation status to the driver is cancelled in step S406.

Figure 4:
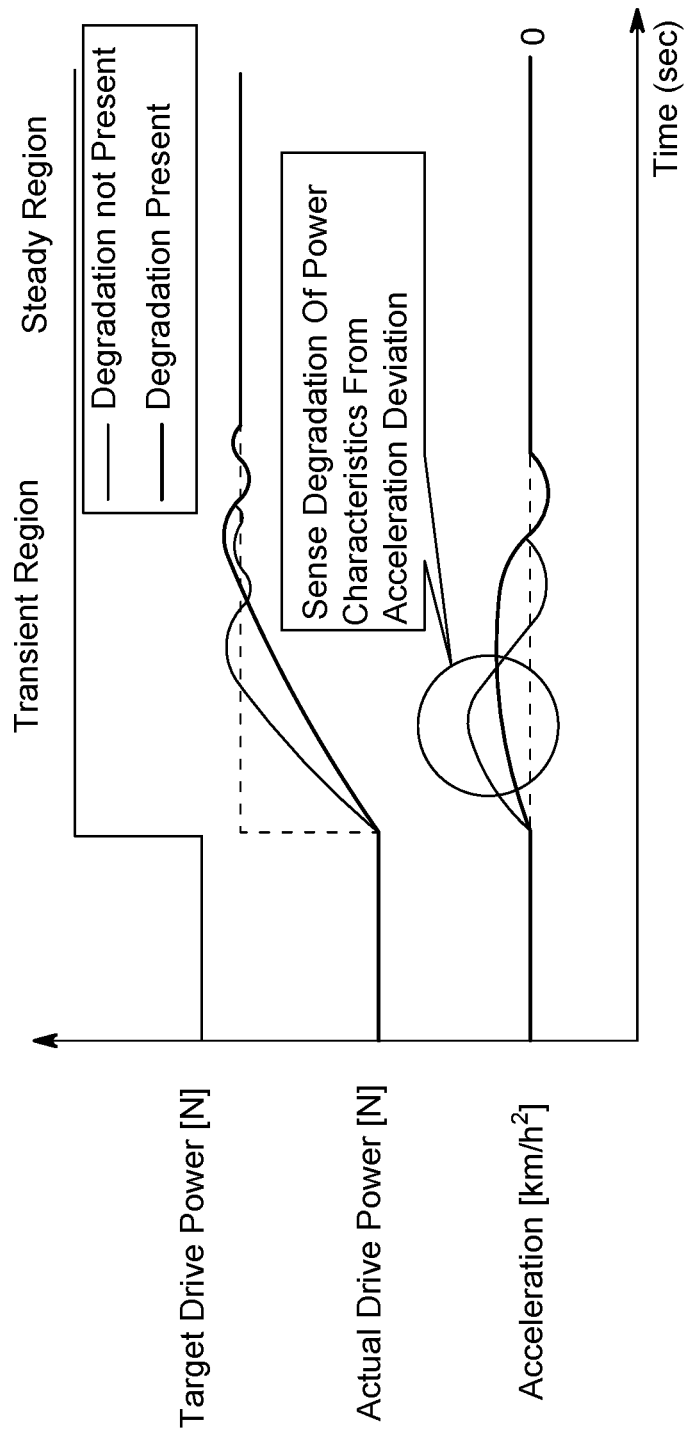
FIG. 4 is a diagram describing a principle of sensing of degradation of power characteristics.

Here, the time degradation determination is described, with reference to FIG. 4. FIG. 4 is a diagram describing a principle for sensing degradation of power characteristics. In FIG. 4, when the target drive power is activated, the actual drive power and acceleration become stable when a steady region is entered after a transient region elapses. When there is a degradation in power characteristics, there is a difference in the fluctuation in the transient region, i.e., there is a difference between a reference fluctuation when degradation is not present (thin solid lines) and the fluctuation when degradation is present (thick solid lines). Due to this, the degradation determination can be performed by storing, in the vehicle information DB, the reference fluctuation of the actual drive power and acceleration in the transient region in a case in which there is no degradation in power characteristics and performing a comparison with the fluctuation in the transient region of the actual drive power and acceleration that are detected.

Acceleration can be calculated from expression (1) below, and drive power can be calculated from expression (2) below.

$$\text{acceleration (km/h}^2\text{)=drive power (N)/vehicle weight (kg)} \quad (1)$$

$$\text{drive power (N)=engine torque (Nm)} \times \text{gear ratio/tire radius (m)} \quad (2)$$

After the notification of degradation status to the driver is cancelled in step S406, processing proceeds to step S407, in which the target correction amount stored in the non-volatile memory 56 in the ATCU 5 is initialized (in detail, the correction amount is set to zero), and processing ends.

Hence, by configuring a mechanism such that the target correction amount is automatically initialized, a dealer, etc., will be able perform processing of clearing abnormality information without a standardly-possessed diagnosis tool, and thus an improvement in serviceability can be achieved.

In step S405, when it is been determined that time degradation is present in a case in which the condition for carrying out the time degradation correction control is satisfied, processing proceeds to step S408, in which notification of degradation status to the driver is performed. Subsequently, in step S409, the calculation of the target correction amount for transmission control is performed. This processing can be implemented by the actuator ECU-side, i.e., the ATCU 5-side, without any problems.

The ATCU 5 calculates a drive command value for actuators based on the estimated engine torque information and target gear ratio information received from the engine ECU 3, and performs drive control of the actuators (solenoid drive control) (step S410). Here, due to the target correction amount received from the vehicle integration ECU 2 being added to the actuator drive command calculation flow, vehicle performance can be stabilized over a long term even when power characteristics of the drive power source and the transmission 16 have changed due to factors such as time degradation.

Subsequently, in step S411, the target correction amount calculated in step S409 is stored to the non-volatile memory 56 in the ATCU 5, and processing ends. By storing the target correction amount in the non-volatile memory 56 in step S411, this target correction amount is applied by default from the next cycle of control.

Meanwhile, during vehicle travel by automated driving, when a determination is made in step S401 based on the map information that the current travel environment does not correspond to the condition for carrying out the time degradation correction control, processing proceeds to step S412, in which the vehicle integration ECU 3 transmits, to the ATCU 5, a command to read out the target correction amount that is stored in the non-volatile memory 56. This target correction amount has been calculated in step S409, and thus, this target correction amount is a correction amount corresponding to the latest temporal change of power characteristics at present.

Subsequently, in step S413, the ATCU 5 calculates a drive command value for actuators based on the estimated engine torque information and target gear ratio information received from the engine ECU 3 and performs drive control, similarly to in step S410. Here, due to the target correction amount received from the vehicle integration ECU 2 being added to the actuator drive command calculation flow, vehicle performance can be stabilized over a long term even when the power characteristics of the drive power source and the transmission 16 have changed due to factors such as time degradation.

Here, the calculation of gear ratio and target correction amount is described. From the deviation in acceleration in the transient region (i.e., from the deviation between the actual acceleration and the stored acceleration), a correction drive power to be added is calculated by using expression (1) above (a fixed value (known value) is used for vehicle weight). Further, by using expression (2) above, the gear ratio for realizing the correction drive power is calculated (a fixed value (known value) is used for tire radius, and it is assumed that engine torque is the target engine torque).

The target correction amount can be calculated by using expression (3) below.

$$\text{target correction amount} = \text{correction drive power (N)} \times \text{tire radius (m)} / \text{target engine torque (Nm)} \quad (3)$$

Figure 5:
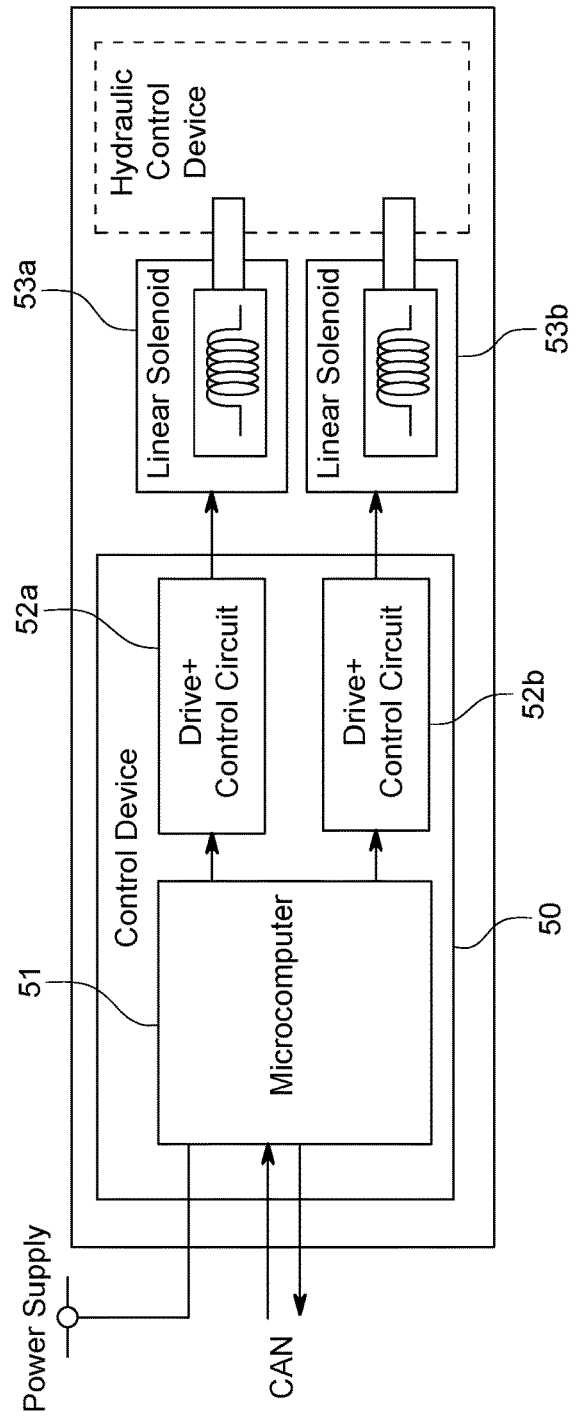
FIG. 5 is a configuration diagram of linear solenoid control for controlling an automatic transmission for a vehicle.
Figure 6:
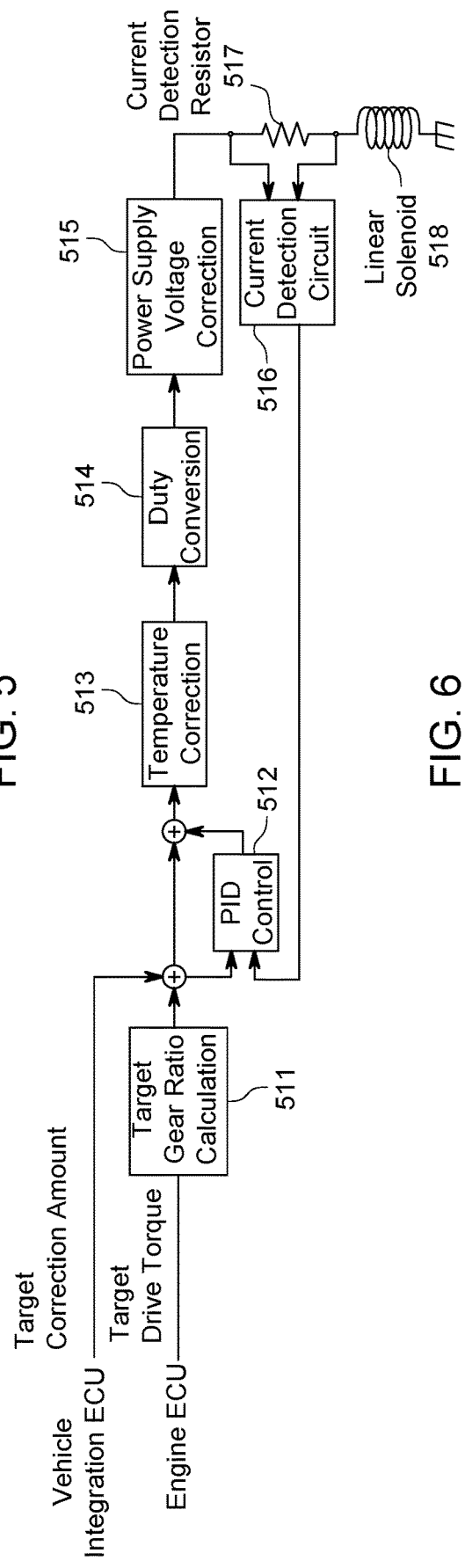
FIG. 6 is a diagram illustrating one example of a control flow of actuator control in an ATCU, according to one example of the present invention.

FIG. 5 is a diagram illustrating one example of an internal configuration of the ATCU 5, and FIG. 6 is a diagram illustrating one example of a control flow of actuator control in the ATCU 5.

In FIGS. 5 and 6, a microcomputer 51 in the ATCU 5 calculates a current command value for solenoid valves, in response to a gear change request from a controller area network (CAN). In linear solenoid drive control units 52A, 52B, first, PID feedback control is performed based on a current deviation between a target current and a monitor current. The current temperature of linear solenoids 53A, 53B is acquired by a temperature sensor mounted on the ATCU 5, and the target current is corrected based on this temperature to calculate an instruction current. Next, for conversion into a signal using which the solenoids 53A, 53B can be driven, current-to-duty conversion is performed to generate an instruction duty, and power supply voltage correction is performed.

Further in detail, as illustrated in FIG. 6, a target gear ratio calculation unit 511 calculates a target gear ratio from the target drive torque supplied from the engine ECU 3, and performs addition with the target correction amount supplied from the vehicle integration ECU 2. Further, a value from a PID control unit 512 is added to the sum of the target gear ratio and target correction amount, and the sum is subjected to temperature correction by a temperature correction unit 513. Further, duty conversion is performed by a duty conversion unit 514, and an instruction current corrected by a power supply voltage correction unit 515 is output to a linear solenoid 518 via a current detection resistor 517.

The current flowing through the current detection resistor 517 is detected by a current detection circuit unit 516 and is fed back to the PID control unit 512. The PID control unit 512 is also supplied with the above-described sum of the target gear ratio and target correction amount.

The above-described actuator control is well-known. However, in the present invention, the target correction amount from the vehicle integration ECU 2 is added with respect to the target gear ratio calculated based on the target drive torque from the engine ECU 3, and thus, it becomes possible to issue an actuator command taking performance as a vehicle into consideration.

The present invention, by sensing degradation of vehicle components and correcting the drive instruction for the transmission 16-side, is capable of stabilizing vehicle behavior (performance) over a long term even when, during automated driving, the power characteristics of the drive power source and the transmission 16 change due to factors such as time degradation over time. Hence, the present invention has the effect of reducing discomfort because until the driver carries out component replacement, the driver is notified of the abnormality and at the same time is able to drive without feeling performance change.

Further, due to the transmission 16-side drive instruction value being corrected regardless of which of the drive power source or the transmission 16 the change in power characteristics occurs at, response is quicker compared to the drive power source. Also, due to the gear ratio being changed, transmission torque to the road surface can be generated as requested and vehicle behavior can be maintained stable.

Further, because the characteristic of the transmission of being a torque amplifier is utilized and smaller rotation speed fluctuation compared to when correction is performed at the drive power source-side is achieved, the present invention leads to an improvement in driveability.

Note that the present invention is applicable to a vehicle on which the automated driving function is not mounted, and the functions of the present invention can be implemented by: sensing vehicle behavior based on a G sensor (acceleration sensor) that is preexistingly mounted; implementing the performance change information acquisition unit and the target correction amount calculation unit according to the present invention by using the engine ECU 3; and transmitting the target correction amount to the ATCU 5 during vehicle control.

Further, the above-described example is configured so that degradation of vehicle component performance is determined from the fluctuation of acceleration and drive power in the transient region and drive correction of the transmission 16 is performed. However, application to a change in performance of vehicle component performance due to the elapse of time is also possible. That is, there are cases in which operation performance changes within a normal range due to the drive operation continuation time from vehicle ignition, even in a state in which there is no degradation in vehicle components. Even in such cases, by specifying in advance the relationship of an ion and water temperature with respect to vehicle component performance by using sensors such as an ion sensor and a water temperature sensor, drive correction of the transmission 16 can be performed based on the detected ion and water temperature. When such a configuration is made, there is no need to carry out the determination of vehicle component degradation at a timing corresponding to a certain surrounding environment, and the drive correction can be performed at a desired timing.

Further, the vehicle posture control ECU 7, which is the performance change information acquisition unit, can be configured so that the vehicle posture control ECU 7 determines whether acquired information relating to a change in performance of vehicle components indicates a predetermined performance change, and when determining that the acquired information relating to the change in performance of the vehicle components indicates the predetermined performance change, specifies a vehicle component of which a temporal change in performance has occurred, and notifies the driver of the vehicle component of which a temporal change in performance has occurred and has the non-volatile memory store, as vehicle component abnormality information, information of the vehicle component of which a temporal change in performance has occurred.

Further, it is also possible to make a configuration so that when the part of which a temporal change in performance has occurred has been repaired or replaced, the vehicle is caused to travel based on control details (automated driving control, etc.) generated in advance once again to acquire vehicle behavior information (acceleration, pitch, etc.) output from the vehicle behavior sensors (the acceleration sensor, the yaw rate sensor, gradient, vehicle speed, etc.), and the abnormality information stored in the non-volatile memory is deleted when the vehicle posture control ECU 7 determines that there is no abnormality.

Further, the vehicle posture control ECU 7, which is the performance change information acquisition unit, may be configured to have the vehicle travel based on control details generated in advance, to acquire vehicle behavior information output from the vehicle behavior sensors 4 in addition to a road surface status, a vehicle speed, and a throttle opening or target drive torque information, and to successively store such performance information in the non-volatile memory 56.

Further, a configuration may be made so that the storing of the correction amount to the non-volatile memory 56 is performed when an ignition switch of the vehicle is turned off (at the end of a driving cycle).

Further, a configuration may be made so that the correction amount stored in the non-volatile memory 56 is read out when the ignition switch is turned on the next time, and correction is performed with respect to the target gear ratio determined by using the target drive torque determined based on the control details (automated driving control, etc.) generated in advance also during an initial travel after the ignition switch is turned on.

REFERENCE SIGNS LIST 1 gateway ECU
2 vehicle integration ECU
3 engine ECU
4 vehicle behavior sensors
5 ATECU
6 engine
16 transmission
7 vehicle posture control ECU
8 recognition-system sensors
21 around self-vehicle position space recognition unit
22 target course calculation unit
23 target vehicle speed calculation unit
31 target acceleration calculation unit
32 target engine torque calculation unit
33 target drive torque calculation unit
54 target gear ratio calculation unit
55 corrected target gear ratio calculation unit
56 non-volatile memory
41 acceleration sensor
42 yaw rate sensor
43 vehicle speed sensor
71 vehicle behavior detection unit
72 performance change information acquisition unit
73 target correction amount calculation unit
81 camera
82 radar

The invention claimed is:

1. A vehicle control device, comprising:
a target drive torque determination unit that determines a target drive torque for a drive torque generation mechanism driving a vehicle based on control details generated in advance, and controls operation of the drive torque generation mechanism;
a performance change information acquisition unit that acquires information relating to a change in performance of vehicle components, the vehicle components including at least one of the drive torque generation mechanism and a transmission that determines a target gear ratio based on the target drive torque; and
a target gear ratio correction unit that corrects the target gear ratio determined based on the target drive torque, in accordance with the information relating to the change in performance, wherein
the target drive torque determination unit performs feedback control of the drive torque generation mechanism based on the determined target drive torque, and the target gear ratio correction unit performs feedforward control of the transmission based on the target drive torque.

2. The vehicle control device of claim 1, further comprising:
a vehicle behavior sensor that senses behavior of the vehicle,
wherein the performance change information acquisition unit acquires vehicle behavior information sensed by the vehicle behavior sensor and acquires, from the acquired vehicle behavior information, the information relating to the change in performance of the vehicle components.

3. The vehicle control device of claim 2, wherein the performance change information acquisition unit determines whether the acquired information relating to the change in performance of the vehicle components indicates a predetermined performance change, and when determining that the acquired information relating to the change in performance of the vehicle components indicates the predetermined performance change, specifies a vehicle component of which a temporal change in performance has occurred, and notifies a driver of the vehicle component of which a temporal change in performance has occurred and has a non-volatile memory store, as vehicle component abnormality information, information of the vehicle component of which a temporal change in performance has occurred.

4. The vehicle control device of claim 3, wherein when the vehicle component of which a temporal change in performance has occurred has been repaired or replaced, the vehicle is caused to travel based on the control details generated in advance once again, vehicle behavior information output from the vehicle behavior sensor is acquired, and the vehicle component abnormality information stored in the non-volatile memory is deleted when the performance change information acquisition unit determines that there is no abnormality.

5. The vehicle control device of claim 1, wherein the target drive torque determination unit determines the target drive torque from a current vehicle speed, a road surface gradient, a surrounding environment, and a target vehicle speed determined based on a target course generated in advance.

6. The vehicle control device of claim 1, wherein the target gear ratio correction unit acquires a temporal change in performance from the performance change information acquisition unit, determines a correction amount applied to the target gear ratio, and corrects the target gear ratio.

7. The vehicle control device of claim 6, wherein the target gear ratio correction unit stores the correction amount applied to the target gear ratio in a non-volatile memory when an ignition switch of the vehicle is turned off.

8. The vehicle control device of claim 7, wherein the correction amount stored in the non-volatile memory is read out when the ignition switch of the vehicle is turned on, and correction is performed with respect to the target gear ratio determined by using the target drive torque determined based on the content details generated in advance also during an initial travel after the ignition switch is turned on.

9. The vehicle control device of claim 1, wherein the performance change information acquisition unit acquires a road gradient and a road curvature radius from map information and acquires the information relating to the change in performance of the vehicle components only when the road gradient and the road curvature radius that are acquired satisfy a predetermined condition.

10. The vehicle control device of claim 1, further comprising:
a vehicle behavior sensor that senses behavior of the vehicle, wherein the performance change information acquisition unit has the vehicle travel based on the content details generated in advance, acquires, as performance information, vehicle behavior information output from the vehicle behavior sensor in addition to a road surface status, a vehicle speed, and a throttle opening or target drive torque information, and successively stores the performance information in a non-volatile memory.

* * * * *